United States Patent
Vehviläinen (10) Patent No.: US 8,103,123 B2
(45) Date of Patent: Jan. 24, 2012

(54) METHOD AND APPARATUS FOR IMAGE IMPROVEMENT

(75) Inventor: Markku Vehviläinen, Tampere (FI)

(73) Assignee: Nokia Corporation, Espoo (FI)

( * ) Notice: Subject to any disclaimer, the term of this patent is extended or adjusted under 35 U.S.C. 154(b) by 652 days.

(21) Appl. No.: 12/221,964

(22) Filed: Aug. 7, 2008

(65) Prior Publication Data
US 2008/0303926 A1    Dec. 11, 2008

Related U.S. Application Data

(62) Division of application No. 10/135,954, filed on Apr. 29, 2002, now Pat. No. 7,426,316.

(30) Foreign Application Priority Data

Jun. 28, 2001 (FI) .................................... 20011394

(51) Int. Cl.
G06K 9/40 (2006.01)
H04N 7/14 (2006.01)

(52) U.S. Cl. ... 382/275; 348/14.02; 348/47; 348/207.99

(58) Field of Classification Search .................. 382/274, 382/275; 348/14.02, 47, 207; 358/406
See application file for complete search history.

(56) References Cited

U.S. PATENT DOCUMENTS

| | | | |
|---|---|---|---|
| 4,394,688 A | 7/1983 | Iida et al. ........................ 348/28 |
| 5,159,436 A * | 10/1992 | Soneira ......................... 348/181 |
| 5,477,264 A | 12/1995 | Sarbadhikari et al. ..... 348/231.6 |
| 5,506,617 A | 4/1996 | Parulski et al. .......... 348/207.99 |
| 5,606,365 A * | 2/1997 | Maurinus et al. .......... 348/222.1 |
| 5,675,380 A | 10/1997 | Florent et al. ................. 348/251 |
| 5,696,850 A | 12/1997 | Paruiski et al. ............... 382/261 |
| 5,712,679 A | 1/1998 | Coles ............................ 348/158 |
| 5,818,527 A * | 10/1998 | Yamaguchi et al. .......... 348/335 |
| 5,905,530 A * | 5/1999 | Yokota et al. ............ 348/240.99 |
| 6,148,103 A | 11/2000 | Nenonen ........................ 382/169 |
| 6,166,729 A | 12/2000 | Acosta et al. ................. 715/719 |

(Continued)

FOREIGN PATENT DOCUMENTS

EP    0 838 939 A2    4/1998

(Continued)

OTHER PUBLICATIONS

Zhang et al., IEEE Publication, 2000, "Non-linear distortion correction in endoscopic video images", pp. 439-442.

*Primary Examiner* — Manav Seth
(74) *Attorney, Agent, or Firm* — Harrington & Smith (57) ABSTRACT

A method and an apparatus for improving the image quality. The method comprises steps of producing image correcting information to decrease errors in the image to be produced by a camera module (109, 111, 112) by comparing the image taken by said camera module (109, 111, 112, 113) with a test image, storing the image correcting information produced and identifying information related to said image correcting information in the memory of an electronic peripheral device (104, 106), receiving the image produced by said camera module (109, 111, 112, 113) and a second piece of identifying information related to said image in the electronic peripheral device (104, 106), comparing said identifying information with said second piece of identifying information in said peripheral device, and performing an image improvement operation on said image in said peripheral device in response to the comparison carried out.

20 Claims, 4 Drawing Sheets

U.S. PATENT DOCUMENTS

| | | |
|---|---|---|
| 6,273,535 B1 | 8/2001 | Inoue et al. .................. 347/3 |
| 6,424,369 B1 | 7/2002 | Adair et al. ................... 348/76 |
| 6,603,885 B1 * | 8/2003 | Enomoto ..................... 382/263 |
| 6,710,896 B1 | 3/2004 | Takaoka ....................... 358/1.9 |
| 6,995,794 B2 * | 2/2006 | Hsu et al. ..................... 348/241 |
| 7,010,144 B1 * | 3/2006 | Davis et al. .................. 382/100 |
| 2002/0065844 A1 | 5/2002 | Robinson et al. ............ 707/500 |
| 2002/0140825 A1 | 10/2002 | Terashita ..................... 348/222.1 |

FOREIGN PATENT DOCUMENTS

| | | |
|---|---|---|
| EP | 0 947 947 A2 | 10/1999 |
| EP | 1 031 812 A2 | 8/2000 |
| JP | 2-032477 | 2/1990 |
| JP | 10-226139 | 8/1998 |
| JP | 10226139 | 8/1998 |
| JP | 11-220687 | 8/1999 |
| JP | 11220687 | 8/1999 |
| JP | 2000199931 | 7/2000 |
| JP | 2002-135742 A | 5/2002 |
| WO | WO99/67743 | 12/1999 |
| WO | WO-00/04492 | 1/2000 |
| WO | WO 01/01675 A2 | 1/2001 |

* cited by examiner

METHOD AND APPARATUS FOR IMAGE IMPROVEMENT

CROSS REFERENCE TO RELATED APPLICATIONS

This application is a divisional patent application claiming priority under 35 U.S.C. 120 to U.S. patent application Ser. No. 10/135,954, filed on Apr. 29, 2002, issued as U.S. Pat. No. 7,426,316 on Sep. 16, 2008, which claims priority under 35 U.S.C. 119, from Finnish patent application no. 20011394, filed on Jun. 28, 2001.

FIELD OF THE INVENTION

The present invention relates to utilization of camera properties in image processing. The invention especially, but not necessarily, relates to improvement of the quality of an image produced by a digital camera.

BACKGROUND OF THE INVENTION

In digital cameras and digital video cameras an optical image is converted into an electronic format by an image sensor, which is typically a photosensitive semiconductor element (Charge Coupled Device CCD or Complementary Metal oxide Semiconductor CMOS). This element is a plate known as a detector matrix which consists of small and regular photosensitive and colour-sensitive picture elements, i.e. pixels. The resolution of the matrix varies according to its physical size and fineness. An image sensor typically comprises hundreds of thousands of pixels, e.g. 640×480=307 200 pixels are used in VGA resolution (video graphics array). Utilization of advanced CMOS technology in the production of image sensors has enabled integration of digital and analogue electronics and the image sensor into the same semiconductor element. The size and weight of the camera module have been reduced, which has made it possible to integrate it into smaller and smaller electronic devices, such as mobile imaging phones.

The quality of an image produced by a camera module is usually proportioned to the display properties of the communication device, e.g. a mobile imaging phone. On a small screen the size of the picture elements that create an image, i.e. pixels, is smaller than in monitors used in offices, and thus at a certain resolution the sharpness of the image appears to be better to the human eye. The image quality on the screen of the communication device can be improved e.g. by providing the image with a greater contrast and more saturated colours. This makes the image seen on the screen of the communication device appear more natural to the viewer and improves its visibility.

When an image produced by a mobile imaging phone is transferred e.g. onto a computer screen which has better display properties than the mobile imaging phone, errors will appear in the image on the computer screen, such as discoloration or distortions. Due to this the image quality may have to be adjusted or improved. Furthermore, since the computing capacity of computers is nowadays considerably greater, a better image quality can be achieved e.g. using a computer program intended for image improvement. However, the user may find computer program of this kind difficult to use, and thus the user must have basic knowledge about the function and properties of image processing software to achieve the desired result in image improvement. Furthermore, the image improvement operation has to be performed separately on each image, which the user may find troublesome and time consuming.

SUMMARY OF THE INVENTION

The present invention provides a method and an apparatus for improving the image quality and especially, but not necessarily, for improving the quality of an image produced in a mobile imaging phone in a peripheral device, such as a computer or a server. Properties resulting from the errors of the camera module used for taking images are stored as image correcting information either in the memory of the camera module or in the memory of the electronic device into which the camera module is integrated or to which it is otherwise connected. Alternatively, the correcting information can be stored in the memory of a peripheral device, such as a computer or a server, which is capable of processing the image information produced by the camera module.

The image correcting information of the camera module is stored preferably during the manufacture of the camera module or the electronic device, such as a mobile imaging phone. The errors the camera module has caused in the image it has produced, such as optical distortions of the camera module lens, discoloration, and problems resulting from the quality of the camera module, such as noise and focus errors, can be reduced by comparing the image taken by the camera module and a test image. One or more image correcting parameters obtained as a result of the comparison are stored as image correcting information. The parameters are preferably stored in the memory of the server, but the image correcting information can also be stored in the memory of the camera module, mobile imaging phone or computer, for example. Storing of the image correcting information during the manufacturing process improves the usability of the device, for example. In that case image conversion does not require information on the properties of the device that has taken the image (camera module, mobile imaging phone) because this information has been stored in the device in advance. Thus image processing can be automated further and made faster. Transmission of the image in the original format e.g. from a mobile imaging phone reduces the amount of capacity required from the mobile imaging device because image processing is not carried out until in a peripheral device, such as a computer or a server.

A first aspect of the invention relates to a method of improving the quality of an image produced by a camera module in an electronic peripheral device, which is capable of processing said image, characterized in that the method comprises: storing image correcting information related to said camera module in the memory of the electronic peripheral device, receiving the image produced by said camera module and identifying information related to said image correcting information in said electronic peripheral device, and performing an image improvement operation on said image in said peripheral device using the image correcting information to which said received identifying information relates.

A second aspect of the invention provides an electronic peripheral device for improving the quality of an image produced by a camera module in said peripheral device, which is capable of processing said image, characterized in that said peripheral device comprises: a memory for storing image correcting information related to said camera module in the memory of said peripheral device, receiving means for receiving the image produced by said camera module and identifying information related to said camera module, and image improvement means for improving the quality of said image using in image improvement the image correcting information to which said received identifying information relates.

A third aspect of the invention provides a system for improving the quality of an image produced by a camera module in an electronic peripheral device, the system comprising at least one camera module which can produce an image and at least one electronic device which can transmit said image and identifying information related to the image to an electronic peripheral device, characterized in that the system further comprises: a memory for storing the image correcting information related to said camera module for said peripheral device, means for transmitting the image produced by said camera module and the identifying information related to said image correcting information to a peripheral device, and image improvement means for performing an image improvement operation to improve the quality of said image using the image correcting information to which said identifying information relates.

A fourth aspect of the invention provides a computer program product for improving the quality of an image produced by a camera module in an electronic peripheral device, which is capable of processing said image, characterized in that the computer program product comprises: computer program means for making said peripheral device store the image correcting information related to said camera module in the memory of said peripheral device, computer program means for making said peripheral receive the image produced by said camera module and identifying information related to said image correcting information, and computer program means for making said peripheral device perform image improvement to improve the quality of said image using the image correcting information to which said received identifying information relates.

BRIEF DESCRIPTION OF THE DRAWINGS

In the following, the invention will be described in greater detail with reference to the accompanying drawings, in which.

DETAILED DESCRIPTION

Figure 1:
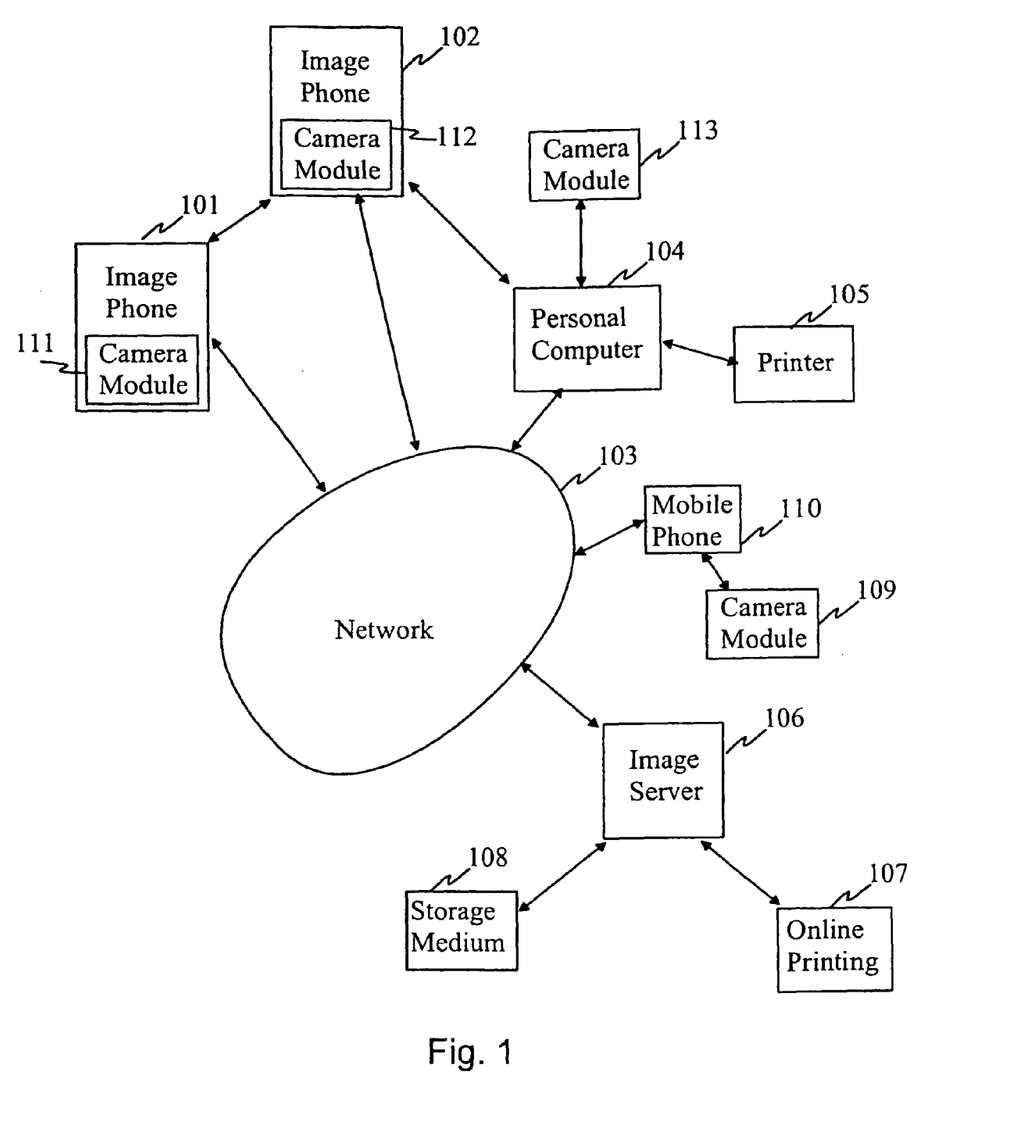
FIG. 1 illustrates a system according to an embodiment of the invention.

FIG. 1 illustrates a system according to an embodiment of the invention, the system comprising one or more mobile imaging phones 101, 102, which comprise a camera module 111, 112. The system further comprises a server 106 and a communication network 103. An image produced by the mobile imaging phone 101, 102 can be transmitted over the network 103 to a server 106, which can store the image in a storage medium 108, or print the image by a printer 107. The system may also comprise e.g. a communication device 110, which can communicate over the network 103, and a computer 104, which can receive the image produced by the mobile imaging device 101, 102 e.g. over the network 103 and e.g. print the image by a printer 105. A camera module (references 109, 113) can be connected to the communication device 110 and the computer 104 for transmitting the image produced over the communication network 103 to a server 106, for example.

The image correcting information of the camera module 109, 113 is stored in the memory of the server 106 preferably during the manufacture of the camera module. The image correcting information of the camera module 113 can also be stored in the memory of the computer 104, for example, and the image correcting information of the camera module 109 in the memory of the communication device 110, for example. The image correcting information of the camera module 111, 112 is stored in the memory 108 of the server 106 preferably during the manufacture of the camera module or the mobile imaging phone 101, 102. The image correcting information of the camera module 111, 112 can also be stored in the memory of the mobile imaging phone 101, 102 or the computer 104.

The mobile imaging phone 102 can receive and transmit images produced by the camera module to another mobile imaging phone 101, computer 104, or server 106 e.g. over a Bluetooth connection or a communication network 103, such as a mobile communication network or the Internet. The image produced by the camera module 112 of the mobile imaging phone 102 can be transmitted to the server 106, for example. The image to be transmitted is also provided with an identifier by means of which the server 106 can identify the mobile imaging phone 112 that has transmitted the image and perform an image improvement operation on the image received using the image correcting information that corresponds to the identifying information and is stored in the memory 108. The server 106 can store the improved image in the memory 108, or if the user of the mobile imaging device 112 so wishes, transmit the image to a printing service for printing by a printer 107. The printing service can be implemented e.g. as follows: the user of the mobile imaging phone 112 informs the server 106 of his/her name and address when transmitting an image, after which the printed image can be mailed to the user of the mobile imaging phone 112, for example. The user of the mobile imaging phone 102 can, if he/she so wishes, retrieve the improved image from the memory 108 for the computer 104 later e.g. via the Internet network and print the image by the printer 105.

The camera module 109 can be connected to the communication device 110 e.g. by a cable, a Bluetooth connection or an optical connection, such as an infrared connection. The image produced by the camera module 109 can be transmitted e.g. by the communication device 110 over the communication network 103 to the server 106. The identifier of the camera module 109 is also transmitted at the same time so that the server 106 can perform an image improvement operation on the basis of the image correcting information related to the identifier of the camera module 109.

The camera module 113 can be connected to the computer e.g. by a cable, a Bluetooth connection or an optical connection, such as an infrared connection. The image produced by the camera module 113 can be transmitted e.g. by the computer 104 over the communication network 103 to the server 106. The identifier of the camera module 113 is also transmitted at the same time so that the server 106 can perform an image improvement operation on the basis of the image correcting information related to the identifier of the camera module 113. Alternatively, the image correcting information corresponding to the identifier of the camera module 113 can be retrieved for the computer 104, and thus the computer 104 can perform an image improvement operation on the image produced by the camera module 113.

The computer 104 may be a portable computer or a workstation and it is capable of receiving images produced by the mobile imaging phone 102 either via a communication network 103, e.g. the Internet, or on the Bluetooth connection or on a similar wireless connection, or over a cable connecting the devices. From the image information the computer 104 receives it can separate camera information which is associated with image information in the mobile imaging phone. The computer 104 can process the images to be displayed on the basis of the above-mentioned camera information. A printer 105 can also be connected to the computer 104 for printing the images. The computer can display the processed images by means of a monitor or the above-mentioned printer.

Figure 2:
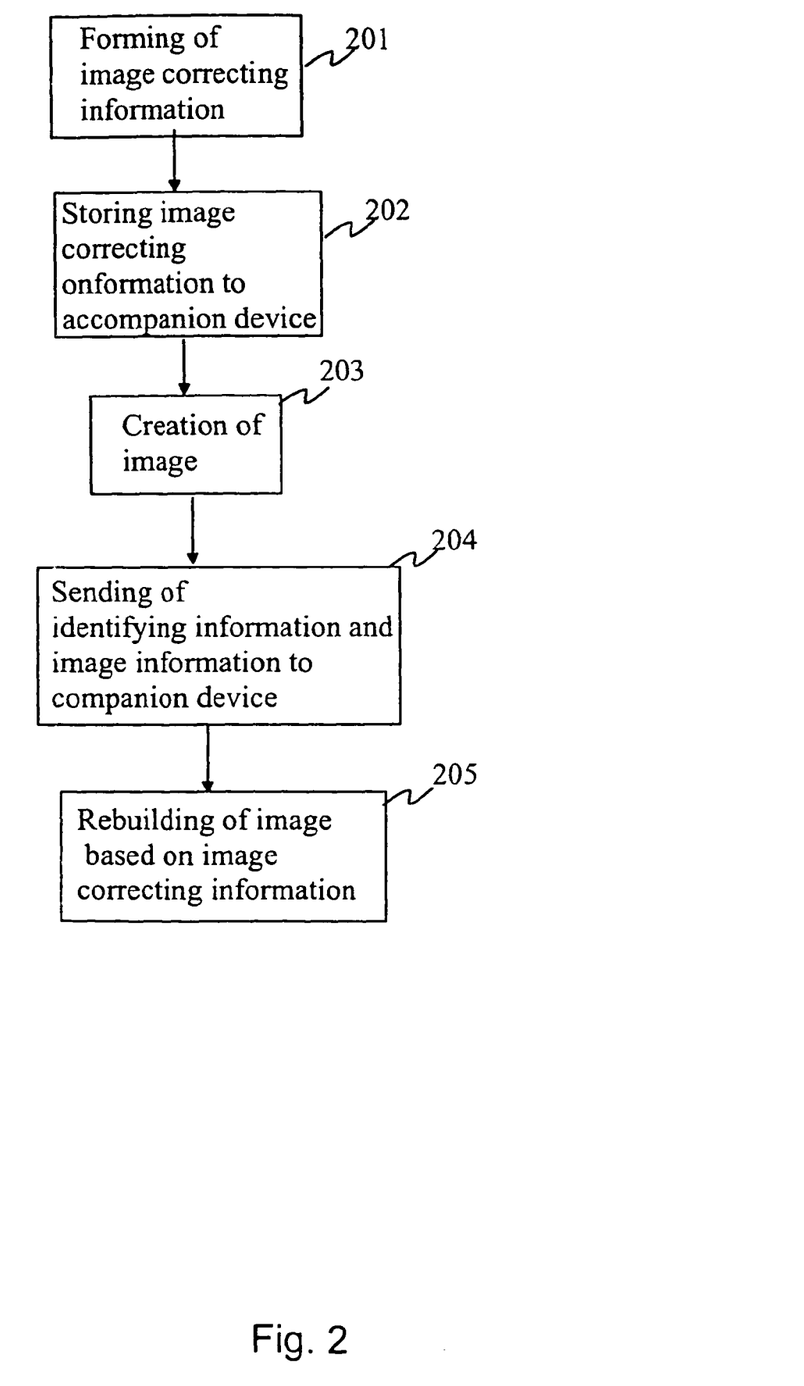
FIG. 2 is a flow chart showing a method according to an embodiment of the invention.

FIG. 2 shows a method according to an embodiment of the invention. In step 201 image correcting information of the camera module is produced, preferably during the manufacture of the camera module. If the camera module is integrated into an electronic device, such as a mobile imaging phone, the image correcting information can be produced during the manufacture of said mobile imaging phone. Alternatively, said image correcting information can be produced e.g. when the camera module or the mobile imaging phone is used for the first time.

The image correcting information is produced by comparing the image taken by the camera module with a test image, and image correcting parameters can be generated on the basis of this comparison according to the error type. The correcting information may include optical errors or image correcting parameters for correcting errors resulting from the quality of the camera module. Optical errors include faults the camera module lens causes in the image and colours. Errors resulting from the quality of the camera module include fixed pattern noise caused by the pixel structure, i.e. thermal noise, which increases as the amount of light decreases. Focus errors, i.e. crispening errors, occur particularly in connection with lenses with a fixed focus, e.g. the whole image is not focused. In that case the centre of the image, for example, can be sharp whereas the edges are fuzzy. Noise and sharpness are geometrical distortions that change radially from the centre of the optics, in which case the image correcting parameters are expressed as the centre of distortion and elliptic form for each colour component R, G and B (red, green and blue). The darkness of the image also changes radially towards the image edges. Darkness can be eliminated e.g. using a function of the $6^{th}$ order having the form $1+ar^2+br^4+cr^6$, where r is the distance from the centre and constants a, b and c are numbers that are defined on the basis of the test image.

In step 202 the correcting information is stored preferably in the memory of the peripheral device, such as a server, a mobile imaging phone or a computer, but it can also be stored in the memory of the camera module. The identifying information of the camera module is stored at the same time. Alternatively, the correcting information can be transferred from the memory of the camera module, mobile imaging phone or computer into the memory of the server e.g. by transmitting the correcting information and identifying information of the camera module, mobile imaging phone or computer to the server. The server stores the correcting information and identifying information and links these data with each other. The server can perform an image improvement operation on the image information it has received on the basis of the correcting information stored in advance and the identifier it has received.

In step 203 an image is produced in the camera module or mobile imaging phone. The image can be a still image or a video image which can be stored e.g. in the memory of said mobile imaging phone.

In step 204 the identifying information of the camera module or the mobile imaging phone and the image information are transmitted to a peripheral device, such as a server or a computer. The identifying information can alternatively be inserted into the above-mentioned image information in the mobile imaging phone, for example.

In step 205 the image information and correcting information are received by a peripheral device, such as a server or a computer, and the image improvement operation is performed on the basis of the correcting information.

Figure 3:
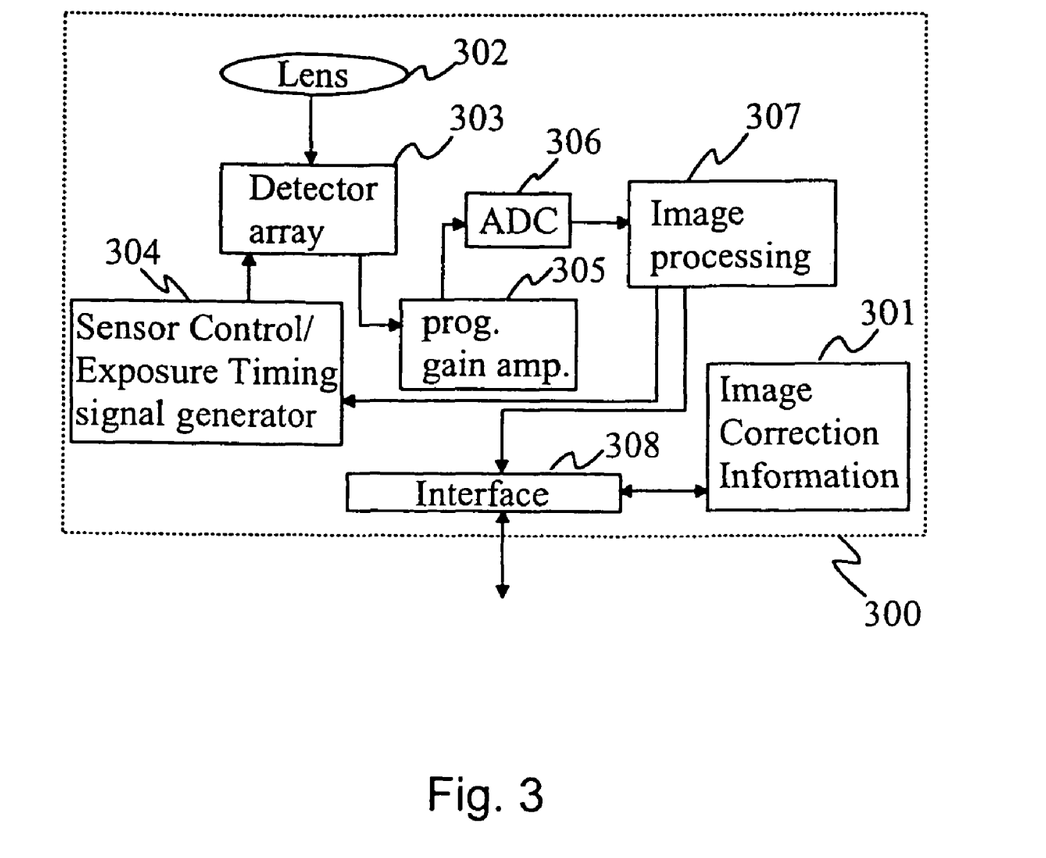
FIG. 3 illustrates a camera module according to an embodiment of the invention.

FIG. 3 illustrates a camera module 300 according to an embodiment of the invention. The camera module comprises a memory or a similar dataslot 301 for the image correcting information, one or more optical lenses 302, a photosensitive CMOS element or a CCD sensor element 303, a control unit 304 for controlling the sensor element, a programmable analogue amplifier 305 (Programmable Gain Amplifier PGA). An analogue image signal is converted into a digital format by an AD converter 306, after which it can be processed (reference 307) by different image processing operations e.g. by adjusting the colour balance and/or the white balance. Via the connection 308 the image signal is transmitted e.g. into the memory of the electronic device, such as the mobile imaging phone, or for display on the screen of the mobile imaging phone.

The correcting information is stored in the memory 301 of the camera module, preferably during its manufacture. The memory 301 also comprises the identifier of the camera module, by means of which the peripheral device can identify the camera module and perform an image improvement operation on the image information corresponding to the identifying information.

Figure 4:
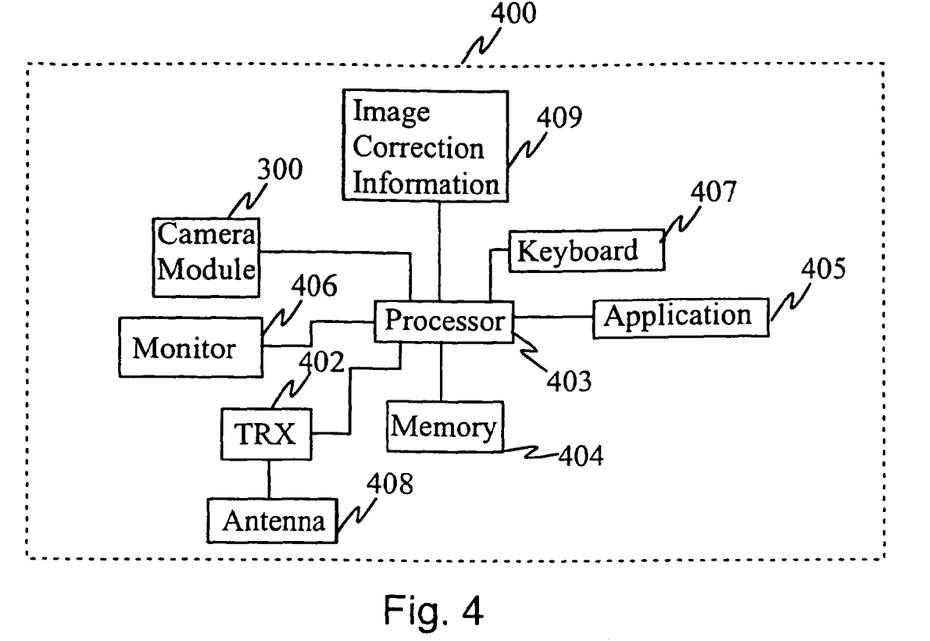
FIG. 4 illustrates a communication device according to an embodiment of the invention.

FIG. 4 illustrates a communication device 400 according to an embodiment of the invention, the communication device comprising a camera module 300 for producing an image onto a screen 406 or into a memory 404, a transceiver 402 and an antenna 408 for transmitting and receiving data, e.g. image information, wirelessly, at least one application 405 for carrying out operations of the communication device, a processor 403 and a memory 404 for performing operations of the communication device 400 and the application 405, a keyboard 407 for feeding commands into the communication device 400. In addition, the communication device 400 comprises image correcting information stored in the memory or in a similar storage medium 409. The memory 404 may further comprise the identifier of the communication device, by means of which the peripheral device can identify the image information transmitted by the communication device and associate the image information with the corresponding image correcting information.

The image correcting information is stored in the memory 409 preferably during the manufacture of the communication device or it can be stored in a storage medium, such as a CD, a DVD, a floppy disk or the like, in advance in some other manner. Alternatively, the correcting information can be produced afterwards, e.g. when the communication device is used for the first time. The camera module of the communication device 400 is used for producing image information which is compared with the test image. The comparison can be performed and the image correcting information produced e.g. by a computer or a similar device. The result of the comparison is used for producing image correcting information, which comprises at least one parameter that describes the interference in the image.

The image information produced by the communication device is transmitted together with the image correcting information to a peripheral device, such as a server or a computer, which performs an image improvement operation on said image information on the basis of said image correcting information. If the image correcting information is already stored in the peripheral device, the identifying information of the communication device can be optionally transmitted with the image information.

Figure 5:
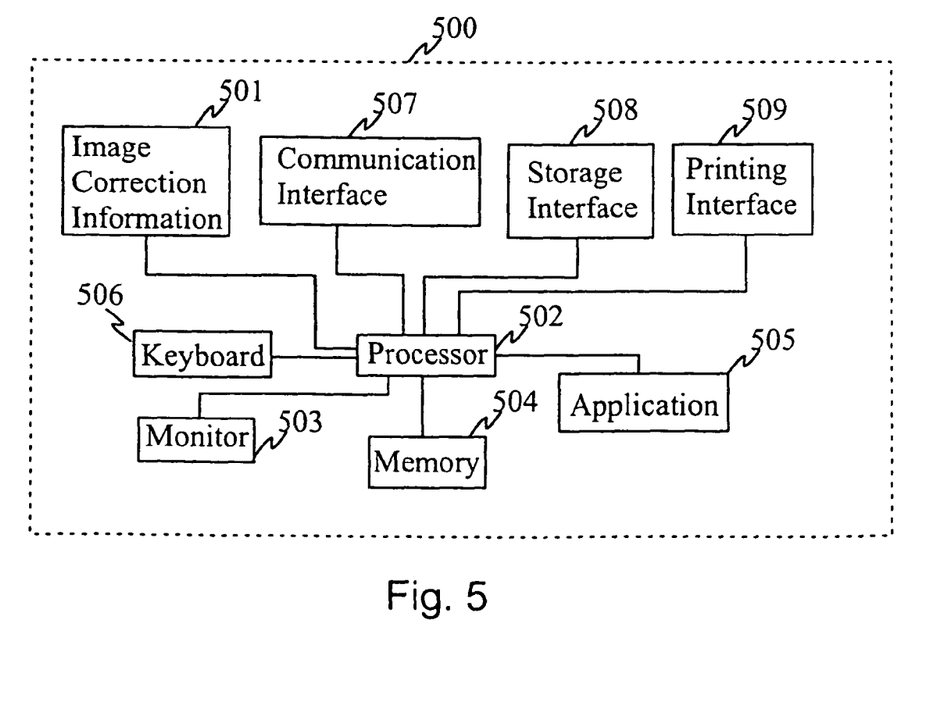
FIG. 5 illustrates a peripheral device according to an embodiment of the invention.

FIG. 5 illustrates a peripheral device 500 according to an embodiment of the invention. The peripheral device is preferably a server, but it may also be a computer. The peripheral device 500 comprises a storage medium 501 for storing image correcting information, a processor 502 and a memory 504 for controlling the operations of the peripheral device, a network interface 507 for receiving the image information and the correcting information and for transmitting corrected image information. The peripheral device 500 also includes a storage interface for storing the received correcting information and the image information in a mass memory, such as a hard disk, and a printing interface 509 for printing the corrected image information received by a printer. The peripheral device 500 may also comprise a keyboard 506 for feeding commands into the peripheral device, a monitor 503 for displaying the image information in visual form and at least one application 505 e.g. for performing an image improvement operation on the received image information on the basis of the image correcting information that corresponds to the image information and is already stored in the memory 501 of the peripheral device.

The peripheral device 500 receives the image correcting information of the camera module, which is preferably produced already during the manufacture of the camera module or an electronic device, such as a mobile imaging phone, into which the camera module is integrated. At the same time the peripheral device 500 also receives identifying information related to said camera module, electronic device or both. The identifying information can also be a serial number or another similar identifying code.

The identifying information and image correcting information received are stored in the memory 501 of the peripheral device and linked with each other. When the peripheral device receives an image produced by the camera module, it also receives identifying information, which is preferably related to the camera module, for example. The peripheral device compares the identifying information it has received with the identifying information stored in the memory 501, and if the identifying information received is found in the memory 501, the peripheral device performs an image improvement operation on the image it has received based on the image correcting information to which said identifying information received and stored in the memory 501 relates.

The implementation and embodiments of the invention were described by means of examples above. It is obvious to a person skilled in the art that the invention is not limited to the details of the embodiments described above and that the invention can be implemented otherwise without deviating from the characteristics of the invention. The embodiments shown should be regarded as illustrative only, i.e. the embodiments and applications of the invention are limited only by the appended claims. Consequently, different optional embodiments of the invention defined in the claims, including equivalent embodiments, fall within the scope of the invention.

The invention claimed is:

1. An apparatus, comprising:
an image processor configured to provide an output comprising data for at least one image captured by a camera module of said apparatus;
a memory configured to store image correcting information, the image correcting information being distinct from the output of the image processor; and
an interface configured to provide said output from the image processor and the image correcting information from said memory to an electronic device configured to correct said data for at least one image using said image correcting information, wherein the image correcting information comprises image correcting parameters expressed as a center of distortion and elliptic form for at least one of a plurality of color components.

2. The apparatus according to claim 1, wherein the image correcting information comprises image correcting parameters expressed as the center of distortion and elliptic form for each component of a plurality of color components.

3. The apparatus according to claim 1, wherein the image correcting information comprises a function for eliminating a darkness of an image.

4. The apparatus according to claim 3, wherein the function for eliminating the darkness is a sixth order polynomial.

5. The apparatus according to claim 1, wherein said electronic device is an image phone or a computer.

6. The apparatus according to claim 1, wherein said interface is a wireless interface configured to provide wirelessly said output and the image correcting information to the electronic device using a BLUETOOTH connection, a radio frequency connection, or an infrared connection.

7. The apparatus according to claim 1, wherein the image correcting information comprises a function for eliminating one or more of: an optical distortion, a noise, and a darkness.

8. The apparatus according to claim 1, wherein the camera module comprises said memory.

9. The apparatus according to claim 1, wherein said apparatus is said camera module.

10. The apparatus according to claim 1, wherein the output from the image processor and the image correcting information are provided wirelessly to said electronic device over a network.

11. A method, comprising:
storing, in a memory of an apparatus image correcting information related to a camera module of the apparatus;
generating data comprising at least one image captured by the camera module; and
transmitting from the apparatus the data comprising at least one image captured by the camera module and said image correcting information, where said transmitting is to an electronic device for correcting said data for said at least one image using said image correcting information, wherein the image correcting information comprises image correcting parameters expressed as the center of distortion and elliptic form for at least one component of a plurality of color components.

12. The method of claim 11, wherein the image correcting information comprises image correcting parameters expressed as the center of distortion and elliptic form for each component of a plurality of color components.

13. The method of claim 11, wherein said electronic device is an image phone or a computer.

14. A peripheral device, comprising:
an wireless interface configured to receive from an electronic device data for at least one image captured by a camera module of said electronic device and an image correcting information for said camera module, a memory for storing said image correcting information; and an image processor, configured to correct said data for improving said at least one image using said image correcting information, wherein the image correcting information comprises image correcting parameters expressed as a center of distortion and elliptic form for at least one component of a plurality of color components.

15. The peripheral device of claim 14, wherein the image correcting information comprises image correcting parameters expressed as a center of distortion and elliptic form for each component of a plurality of color components.

16. The peripheral device of claim 14, wherein said peripheral device is an image phone or a computer.

17. An apparatus, comprising:

an interface, configured to receive from an electronic device data for at least one image captured by a camera module of said electronic device and an identifier for said camera module, a memory for storing image correcting information, said image correcting information being identified using the identifier for the camera module, wherein said image correcting information comprises image correcting parameters expressed as a center of distortion and elliptic form for at least one or each component of a plurality of color components; and an image processor, configured to correct said data for improving said at least one image using said image correcting information.

18. The apparatus of claim 17, wherein said image correcting information is stored in a storage medium outside of said apparatus, and after being identified using said identifier for said camera module, said image correcting information is provided to said memory.

19. The apparatus of claim 17, wherein said apparatus is a server, a computer or an image phone.

20. The apparatus of claim 17, wherein said data for the at least one image captured by the camera module of the electronic device and the identifier for the camera module is provided to the apparatus using one or more of: a BLUETOOTH connection, a radio frequency connection, an infrared connection, a wireless connection, a connection over a network or a wired connection.

* * * * *